United States Patent [19]

Austad

[11] Patent Number: 4,801,239

[45] Date of Patent: Jan. 31, 1989

[54] ARM DEVICE

[75] Inventor: Arne Austad, Kolsas, Norway

[73] Assignee: Multi Craft a.s., Norway

[21] Appl. No.: 78,300

[22] PCT Filed: Sep. 19, 1986

[86] PCT No.: PCT/NO86/00067

§ 371 Date: Jul. 21, 1987

§ 102(e) Date: Jul. 21, 1987

[87] PCT Pub. No.: WO87/03139

PCT Pub. Date: Jun. 4, 1987

[30] Foreign Application Priority Data

Nov. 26, 1985 [NO] Norway .................................. 854720

[51] Int. Cl.$^4$ ............................................. B66C 23/00
[52] U.S. Cl. ................................. 414/680; 248/163.1;
248/179; 248/396; 901/18; 901/22
[58] Field of Search ..................... 901/14–18,
901/22; 414/7, 680, 697; 248/396, 371, 164,
179, 163.1, 172, 173, 200.1, 644, 398

[56] References Cited

U.S. PATENT DOCUMENTS

| 3,215,391 | 6/1964 | Storm . | |
|---|---|---|---|
| 3,288,421 | 3/1965 | Peterson . | |
| 3,374,977 | 3/1968 | Moy, Jr. . | |
| 3,419,238 | 12/1968 | Flory | 248/163.1 |
| 3,577,659 | 5/1971 | Kail | 248/396 |
| 4,374,497 | 2/1983 | Harmand | 248/163.1 |
| 4,395,163 | 7/1983 | Perraud . | |
| 4,407,625 | 10/1983 | Shum . | |
| 4,536,690 | 8/1985 | Belsterling et al. . | |

FOREIGN PATENT DOCUMENTS

| 112099 | 6/1984 | European Pat. Off. | 901/15 |
|---|---|---|---|
| 202206 | 11/1986 | European Pat. Off. | 901/14 |
| 2540572 | 3/1977 | Fed. Rep. of Germany . | |
| 115050 | 7/1968 | Norway . | |
| 148216 | 5/1983 | Norway . | |
| 8701645 | 3/1987 | PCT Int'l Appl. | 901/14 |
| 403925 | 9/1978 | Sweden . | |
| 1054044 | 11/1983 | U.S.S.R. . | |
| 1222538 | 4/1986 | U.S.S.R. | 901/14 |
| 2083795 | 3/1982 | United Kingdom | 901/14 |
| 2143498 | 2/1985 | United Kingdom . | |
| 2173472 | 10/1986 | United Kingdom | 901/14 |

Primary Examiner—L. J. Paperner
Assistant Examiner—Jennifer L. Doyle
Attorney, Agent, or Firm—Bacon & Thomas

[57] ABSTRACT

Arm device adapted to move and position a first basic part (6) relatively to a second basic part (4), comprising at least three arms (1,2,3,7) capable of being extended and shortened in a controlled manner, said arms being free to pivot in attachments (5) on the second basic part, while one attachment on the first basic part is rigid, and one of said arms is torisonally rigid. A third basic part (15) is connected to the first basic part through a joint (16), and at least one auxiliary arm (12,13) is at one end connected to one of the arms (7) through a joint, while the other end of the auxiliary arm is connected to the third basic part (15), and the lengths of the auxilary arm can be varied. Thereby is achieved that the arm device has a large number of degrees of freedom with respect to movement of the third basic part, which holds a tool or a tool holder. Moreover, the tool or the tool holder may be journalled for rotation relatively to the third basic part (15).

4 Claims, 1 Drawing Sheet

U.S. Patent
Jan. 31, 1989
4,801,239
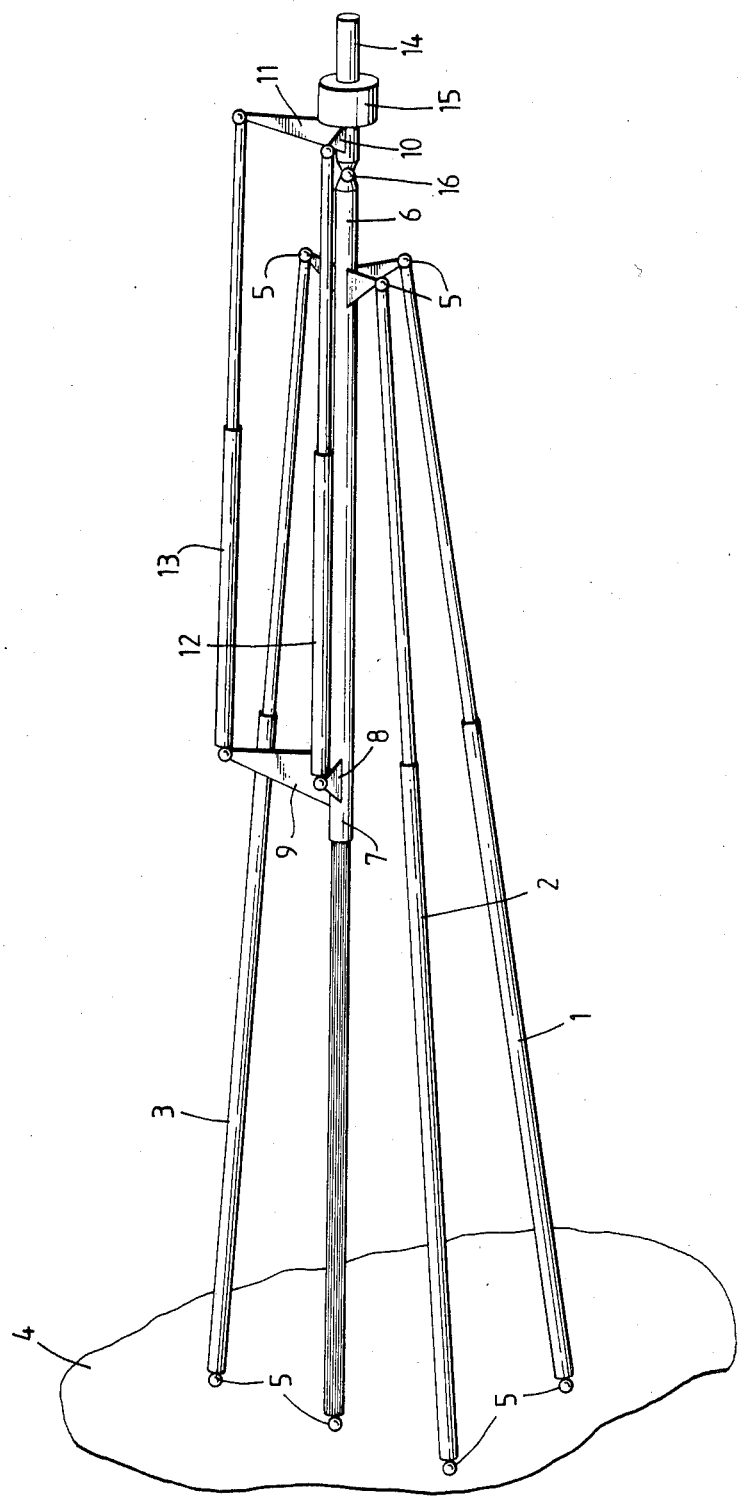

ARM DEVICE

BACKGROUND OF THE INVENTION

The present invention relates to an arm device adapted to move and position a first basic part relatively to a second basic part, said arm device comprising at least three arms capable of being extended and shortened in a controlled manner, and the arms are free to pivot in their attachments on the second basic part, while one attachment on the first basic part is rigid, and one of the arms is torsionally rigid. Such a device is known from Norwegian acceptance print No. 148216. As examples of the use of such an arm device are mentioned industrial robot, drilling rig for tunnels and mines, adjustment device for aerials.

As further examples of known technique are mentioned:

U.S. Pat. No. 3,215,391 shows an arm device capable of being used for for instance adjustment of the position of an aerial, which, thus, constitutes one of the basic parts, while the other end of the arms is fastened to for instance a plate or similar, which may be stationary or for instance fastened to a vehicle. The arms are rigidly attached in each basic part, and are constituted by telescopic arms having universal joints at the middle. This permits that one of the basic parts can pivot about two of the universal joints relatively to the second basic part, and the pivotal movement is controlled by extension or shortening of that arm whose universal joint is not situated along the pivot axis. Moreover, it is possible to displace the basic parts parallelly to each other, by extending and shortening the arms. Thus, the possibilities of moving the basic parts mutually are very restricted.

U.S. Pat. No. 3,374,977 shows a similar arm device, being adapted for aerial adjustment. The device comprises four arms being fastened with their ends to two basic parts. Said four arms, which can be extended and shortened and have universal joints at each end, have attachments at the corners of equally large squares, and a fifth arm having a fixed length and universal joints at each end is fastened to the basic parts at the center of said squares.

The basic parts can be freely adjusted with respect to mutual direction, but the mutual adjustment is restricted, in that the fifth arm maintains a fixed distance between the middle portions of the basic parts. At least two of those arms that are capable of changing their length must be actuated simultaneously. Moreover, the arm device is statically indeterminated, and is not torsionally rigid, when the arms have equal lengths.

U.S. Pat. No. 3,288,421 also shows an arm device adapted to move a basic part relatively to another, and permits both a mutual angular adjustment and parallel displacement. The device comprises six arms, and the ends of two by two arms are journalled in the same pivot point, whereby the arms stand in a zigzag pattern between the basic parts. The device presupposes that both of the basic parts have a relatively large area, and the number of arms is relatively large. The mutual movement of the basic parts is very restricted.

Said Norwegian acceptance print No. 148216 shows a tool at the free end of the arm device. Said tool, which may of course be of a different structure than that shown in the print, is rigidly mounted on the first basic part, and can consequently only perform movements determined by the movements of said basic part. For some applications the possibilities of movement of the tool are too restricted. Said basic part, and consequently also the tool, are rigidly connected to the end of one arm and can, therefore, only perform pivotal movements about the other basic part, about the pivotal mounting of said arm on the other basic part, possibly combined with movement towards or from the other basic part. In other words the tool always follows all the movements of the first basic part.

SUMMARY OF THE INVENTION

The object of the present invention is to achieve that the tool may also be moved relatively to the first basic part, at least in a tilting movement about one pivot axis, possibly about two pivot axes. In accordance with the invention this is achieved with an arm device as specified in the succeeding claims.

The invention implies that the third basic part, and consequently also the tool, have four or five degrees of freedom with respect to movement. A sixth degree of freedom can be achieved in that the third basic part can rotate relatively to the arm device. Thereby the tool can be brought to any spatial position, within the limits determined by the dimensions of the arm device and the possibilities of movement of the arms and the auxiliary arms, and the tool can be given any orientation in the space. Thus, an arm device has been achieved which theoretically gives unlimited possibilities of positioning tools.

For applications of the arm device in cases where it is essential to achieve as exact positioning as possible of the basic parts relatively to each other the arm device can be equipped with means for measuring the actual length of the arms, i.e. in such a manner that a possible elastic extension or shortening of the arms due to the prevailing loads is included in the measurement. The measured values can be compared with the desired values, and corrections of the arm lengths can be performed.

The arms may for instance be hydraulic cylinders, and it is possible to use programmed control, as for known types of robots. The measured values of the arm lengths can be fed to the control system, which continuously performs corrections based on the measured values.

The arm device can be made with only three main arms, of which one must be able to transfer a bending moment. The same arm, or one of the others, must be able to transfer torque. One arm, therefore, is rigidly connected to the first basic part, and the two portions of the arm which can be mutually shifted for varying of the length of the arm may be prevented from mutual rotation. The arm is fastened to the second basic part in such a manner that it can pivot in all planes, but without being able to rotate relatively to the second basic part. Alternatively said arm may only be adapted to transfer bending movement, and not torque, as the latter is transferred through another arm.

The arms may also be comprised of something else than cylinders and piston rods, such as electrically driven arms, for instance according to the solenoid principle or by means of a threaded rod which is screwed relatively to a sleeve.

It is no absolute presupposition that the shortening and extension of the arms can be controlled within two extreme limits. An arm device according to the invention may also be utilized in such a manner that one or more arms can merely perform their full stroke, i.e. that the movement cannot be stopped in any intermediate position. The arm device may then be used for instance for moving items between fixed points, whereby the mutual positions of the points are determined by the largest and smallest arm lengths.

BRIEF DESCRIPTION OF THE DRAWINGS

In the following the invention will be explained more detailed by means of an embodiment, shown on the accompanying drawing. In the example those arms which are capable of being extended and shortened are shown as cylinders with piston rods, but as mentioned the arms can be made quite differently.

The drawing shows an embodiment with four arms between two basic parts. Three of the arms are capable of being extended and shortened, while the fourth arm, which is in rigid connection with one basic part, always has a length which is determined by the other three arms, and, therefore, has no means for forced variation of the length. Moreover, the fourth arm is torsionally rigid.

DESCRIPTION OF PREFERRED EMBODIMENTS

The arm device shown comprises three arms 1,2,3 provided mainly in the corner edges of a pyramid. These three arms are fastened with one end to each basic part 4,6 through ball joints or universal joints 5, and each arm can be extended and shortened. Moreover, the arm device comprises a fourth arm 7. The arm 7 is fastened to the basic part 4 through a universal joint 5, while the other end of the arm 7 is rigidly connected with the basic part 6. In addition the arm 7 can transfer torque. This is indicated in that the rod portion of the arm is splined, whereby the splines are guided in corresponding recesses in the cylinder portion. The arm 7 is not connected to any system for forced variation of the length, because the length of the arm alone is adapted to the length variations of the other arms 1,2 and 3.

Moreover, the arm device may be equipped with not shown means for indicating the actual length of the arms 1,2 and 3.

The arm 7 will transfer both bending moments and torque. The arms 1,2 and 3 are only able to be exposed to tension and pressure, and measuring or indicating of the actual arm length, therefore, gives an unambiguous expression of the position of the tool relatively to the basic part 4 or of the relative position of the two basic parts 4 and 6.

The arm being capable of transferring torque may have the function of preventing mutual rotation of the basic parts, but may also be used to cause a controlled mutual rotation of the basic parts. Such rotation is possible due to the joints at each end of the other arms, and mutual rotation of the basic parts can be performed to such an extent (rotation angle) that the arms are obstructed by each other. Thus, the rotation angle can be very large. During such rotation the basic parts will, provided that the lengths of the arms which have joints are held constant, approach each other progressively on both sides of a normal position where the distance between the basic parts is at a maximum. If the rotation starts when the arms are somewhat shortened the distance between the basic parts can be held constant during the rotation, by gradually extending the arms. The arm causing the rotation will take the necessary length at any moment.

There are several possibilities of transferring the torque necessary for such rotation. A servomotor may for instance be provided in one of the basic parts, in order to rotate the end of the arm being capable of transferring torque relatively to the respective basic part. The mutual rotation may also take place in the arm proper, in that means are provided for controlled mutual rotation of two arm portions.

In the embodiment shown such rotation as mentioned above can be carried out for instance in that the thick portion of the arm 7 contains a servomotor which can rotate the thin portion of the arm relatively to the thick portion, so that the basic part 6 rotates relatively to the basic part 4. The rotation angle will be limited by mutual contact between the arms 1, 2 and 3.

The above described arm device corresponds to the arm device appearing from Norwegian acceptance print No. 148216.

In the example shown there are, between the arm 7 and a third basic part 15, provided auxiliary arms 12 and 13. The third basic part 15, being merely shown diagrammatically in the form of a cylinder, is fastened to the basic part 6 by means of a joint 16, being a hinge or a ball joint or universal joint, and in the example the auxiliary arms 12 and 13 are fastened through supports 8,9 and 10,11 to the arm 7 and the third basic part 15, respectively. The auxiliary arms 12 and 13 are telescopic and are connected to the supports 8,9,10 and 11 through joints, and the lengths of the auxiliary arms can be adjusted. It will be appreciated that all the supports 8,9,10 and 11 will follow the movements of the arm 7 as long as the auxiliary arms 12 and 13 have constant lengths. Thereby the movements of the third basic part 15 are determined merely by the arms 1,2,3 and 7. In addition extension and shortening of the arms 12 and 13 cause tilting movement of the third basic part about the joint 16.

The third basic part, and hence the tool, has five degrees of freedom for movement. A sixth degree of freedom can be achieved in that the tool 14 can rotate relatively to the third basic part 15, which is shown diagrammatically as a short cylinder, while the tool 14 is shown diagrammatically as an elongate, thinner cylinder.

In the embodiment shown the arm 7 is inverted relatively to the arms 1,2 and 3. This is merely due to practical reasons when the arms are constituted by cylinders having pistons and piston rods. The provision of the cylinders of the arms 1,2 and 3 nearest to the basic part 4 implies that the mass of the moving parts is small and that the cylinders take up space where most space is available. The arm 7 has its cylinder nearest to the third basic part 15 because it is most appropriate to mount the supports 8 and 9 on a cylinder rather than mounting them on a substantially thinner piston rod.

The invention can be materialized with only one auxiliary arm, provided that the joint 16 is a hinge joint having only one pivot axis. This, however, reduces the number of degrees of freedom.

Under all circumstances the joint 16 must be capable of transferring torque, because the third basic part 15 must not be able to pivot freely relatively to the first basic part 6.

I claim:

1. Arm device adapted to move and position a first basic part (6) relatively to a second basic part (4), comprising at least three arms (1, 2, 3, 7) capable of being extended and shortened in a controlled manner, one end of each of said arms being free to pivot in attachments (5) on the second basic part, the other end of each of said arms being attached to said first basic part with the attachment of one of said arms to the first basic part being rigid, and one of said arms (7) is torsionally rigid, characterized in that a third basic part (15) is connected to the first basic part (6) through a joint (16), and that at least one axiliary arm (12, 13) of positively and controllably adjustable length is connected to and arranged to be movable in its entirety with said other end of said torsionally rigid arm through a joint, while the other end of the auxiliary arm is connected to the third basic part (15), which is adapted to hold a tool (14).

2. Arm device as claimed in claim 1, including two auxiliary arms (12,13), and that said joint (16) is a ball joint or universal joint.

3. Arm device as claimed in claim 1, including one auxiliary arm, and that said joint (16) is a hinge joint having one pivot axis.

4. Arm device as claimed in claim 1, characterized in that said tool (14) or a tool holder is journalled for rotation relative to the third basic part (15).

* * * * *